(12) United States Patent
Liu et al.

(10) Patent No.: US 7,725,661 B2
(45) Date of Patent: *May 25, 2010

(54) DATA-AWARE CACHE STATE MACHINE

(75) Inventors: Wei Liu, Bellevue, WA (US); Steven H. Kahle, Edmonds, WA (US)

(73) Assignee: Plurata Technologies, Inc., Seattle, WA (US)

( * ) Notice: Subject to any disclaimer, the term of this patent is extended or adjusted under 35 U.S.C. 154(b) by 29 days.

This patent is subject to a terminal disclaimer.

(21) Appl. No.: 12/054,834

(22) Filed: Mar. 25, 2008

(65) Prior Publication Data

US 2008/0172531 A1 Jul. 17, 2008

Related U.S. Application Data

(63) Continuation of application No. 11/047,433, filed on Jan. 31, 2005, now Pat. No. 7,356,651.

(60) Provisional application No. 60/540,431, filed on Jan. 30, 2004.

(51) Int. Cl.
*G06F 12/00* (2006.01)
(52) U.S. Cl. .............. 711/144; 711/143; 711/135; 711/145; 711/136; 711/142; 711/E12.017; 711/E12.022
(58) Field of Classification Search .............. 711/118, 711/141

See application file for complete search history.

(56) References Cited

U.S. PATENT DOCUMENTS 4,825,360 A 4/1989 Knight, Jr.
5,274,787 A 12/1993 Hirano et al.
6,349,363 B2 2/2002 Cai et al.
6,397,298 B1 5/2002 Arimilli et al.
6,922,754 B2 7/2005 Liu et al.
2003/0005223 A1 1/2003 Coulson et al.
2005/0076115 A1 4/2005 Andrews et al.

OTHER PUBLICATIONS

Ahamed, Nawaaz. Data Cache Optimizations for Java Programs. Cornell University [online] May 30, 2001, [retrieved on Mar. 12, 2007]. Retrieved from the Internet <URL: http://gatekeeper.dec.com/pub/DEC/SRC/technical-notes/SRC-1997-028-html/ahmed.html >.
Zhang et al. Two Fast and High-Associativity Cache Schemes. [online] Sep./Oct. 1997, [retrieved on Mar. 19, 2007]. Retrieved from the Internet <URL: http://ieeexplore.ieee.org/iel1/40/13512/00621212.pdf?tp=&arnumber=621212&isnumber=13512>.

*Primary Examiner*—Reginald G Bragdon
*Assistant Examiner*—Larry T Mackall
(74) *Attorney, Agent, or Firm*—Frommer Lawrence & Haug LLP; John W. Branch

(57) ABSTRACT

Management of a Cache is provided by differentiating data base on attributes associated with the data and reducing storage bottlenecks. The Cache differentiates and manages data using a state machine with a plurality of states. The Cache may use data patterns and statistics to retain frequently used data in the cache longer. The Cache uses content or attributes to differentiate and retain data longer. Further, the Cache may provide status and statistics to a data flow manager that determines which data to cache and which data to pipe directly through, or to switch cache policies dynamically, thus avoiding some of the cache overhead. The Cache may also place clean and dirty data in separate states to enable more efficient Cache mirroring and flush.

24 Claims, 6 Drawing Sheets

DATA-AWARE CACHE STATE MACHINE

CROSS-REFERENCE TO RELATED APPLICATION

This utility patent application is a Continuation of allowed U.S. patent application Ser. No. 11/047,433 filed on Jan. 31, 2005, which claims the benefit of U.S. Provisional Application No. 60/540,431, filed Jan. 30, 2004, the benefits of which are claimed under 35 U.S.C. §120 and 35 U.S.C. §119(e) respectively, and are further incorporated herein by reference.

FIELD OF THE INVENTION

This application relates generally to computers, and more specifically to caching data.

BACKGROUND

The size of mass storage continues to grow at a phenomenal rate. At the same time, the data that is stored on mass storage devices also continues to grow. Many applications are designed to take advantage of this expanded storage and often install files that would have consumed hard drives of only a few years ago. Data centers also have found ways to use the increased storage capacity. Databases on the order of terabytes are common while databases of much larger sizes are also increasing in number. Efficiently and cost effectively differentiating and managing data according to value to the business has become a challenge for enterprises.

The speed improvement of computer microprocessor and memory has been exponential, roughly tracking the Moore's law—doubling every 18 months. Similarly, the growth of network bandwidth between storage devices and CPUs has relatively kept the same pace. Quickly moving large amounts of data between storage devices and applications continues to remain a challenge for both personal and enterprise applications.

Hard disk manufacturers have responded by developing faster hard drives and larger hard drive caches. However, due to the nature of electro-mechanical mechanisms and very limited amount of disk cache relative to the hard disk capacity, the hard drive's performance has only improved linearly. The performance gap between fast CPUs and slow hard drives has and continues to grow, making storing or retrieving data or code from a hard drive one of the most significant bottlenecks to increased system performance. Various forms of caching have been used that speed up the transfer of data and code to both local and remote storage. Traditional least recently used (LRU) cache replacement algorithms have some benefits, but are ineffective and inefficient in dealing with some common application data patterns, such as a large stream of sequential data (e.g., a large video stream, or simply loading a large database). In part, this is because the large stream of sequential data can "flood the cache" or invalidate and push out hot data previously residing in the cache. Segmented cache techniques have attempted to address this problem but still have many shortcomings such as overhead incurred by caching data this is only used once, latency when a host issues a request that causes a cache miss when the cache is full, and flushing problems.

SUMMARY

Briefly, the present invention provides a cache management method and system directed to reducing the bottleneck to storage, improving cache effectiveness and efficiency, and improving data management effectiveness and efficiency. In one aspect of the invention, the cache is aware of the how recently the data has been accessed, how frequently the data is accessed, and whether the data is clean or dirty. This "data-aware" cache (DAC) is assisted in differentiating and managing the data with these different attributes by using a state machine.

In one aspect of the invention, a DAC is interfaced with an intelligent data flow manager (IDFM). The DAC keeps track of statistics such as hits or misses, free cache lines available, and passed this information to IDFM. This assists the IDFM in making decisions as to whether the IDFM should direct the data to bypass the DAC or choose one cache policy over the other (e.g., write allocate vs. write invalidate).

In another aspect of the invention, the DAC comprises a state machine that assists in keeping frequently used data in cache while removing infrequently used data. Transitions between any of the two states occur when certain conditions are met. These transitions and conditions are described in detail in later sections.

In another aspect of the invention, the DAC has a set of thresholds (e.g., min or max dirty lines and max sticky or sticky dirty lines). When a threshold is met, the DAC may take certain actions to redistribute cache lines among the states or notify the IDFM to initiate one or more actions to rebalance the cache (e.g., flush).

In another aspect of the invention, the data-aware cache provides a mechanism for advanced flushing management to avoid or alleviate cache stress conditions and system stress conditions. The mechanism includes providing to IDFM the stats of clean, dirty and free lines within the cache, enabling IDFM to pace the flush and flush the cache during relatively idle times or when the stress on the cache exceeds a threshold, avoiding flush during certain read requests, eliminating the need of reads waiting for flush and read induced write, routing data directly through while bypassing the cache, avoiding flushing out hot dirty lines earlier than necessary, or taking other measures to improve the performance of the cache and the entire system.

In another aspect of the invention, the data-aware cache provides a mechanism for switching cache write policies dynamically in order to alleviate cache and/or storage system stress condition. The mechanism involves providing to the IDFM the stats of clean, dirty, and free lines within the cache, enabling IDFM to examining data access characteristics, state of cache, state of I/O components or other factors, dynamically choosing write through, write back, write invalidate, or routing data directly through while bypassing the cache, or taking other measures to improve the performance of the cache and the entire system.

In yet another aspect of the invention, the data-aware cache provides a mechanism for efficient management of dirty cache lines. As described in more detail below, a dirty cache line may sometimes exist in one of the following three states: Dirty, StickyDirty, or Flush. Each state may maintain its cache lines with a LRU list so that no search is required in order to flush a dirty cache line. The hierarchy of Flush, Dirty, and StickyDirty states assists the DAC in retaining hot dirty lines in cache as long as possible, but also efficiently flushes dirty lines when needed. This assists in avoiding dirty cache lines that are never flushed, thus, improving the system reliability. Moreover, this mechanism of efficient dirty lines management assists in more efficient cache mirroring (e.g., such as mirroring only dirty cache lines), thus saving limited cache memory and further improving system performance and reliability.

In yet another aspect of the invention, the data-aware cache contains a hash table that uses a list for collision resolution. In one implementation, the collision resolution list is also a LRU in order to speed up look up.

The data-aware cache may be implemented in the operating system of a computer or in other software running on the computer. The methods described herein may replace or complement the traditional caching used in the operating system or applications. In addition, or alternatively, the system and methods described herein may be inserted as a filter driver, intercepting I/O and using system memory as cache. This may be used, for example, to cache as close to the data requestor as possible.

The data-aware cache may use other attributes associated with the data to differentiate and manage the data. For example, an attribute can be an XML tag or a type of metadata. In this case, the Sticky and StickyDirty states become Tag and TagDirty states, respectively, or MetaData and MetaDataDirty states, respectively. In effect, the use of content-related attributes to differentiate and manage data makes the cache a content-aware cache. The data-aware cache may also use application-related attributes, for example, file extensions, to differentiate and manage data in the cache. This may be used to make the cache an application-aware cache.

Aspects of the invention may be incorporated into a Host Bus Adapter (HBA). For example, methods and systems described herein may be incorporated into a HBA that resides in a computer using either resident memory on the HBA or system memory as the cache memory. Host Bus Adapters often have multiple microprocessors with direct memory access (DMA) that make system memory practical for this application.

Aspects of the invention may be realized by embedding the system and methods described herein into intelligent I/O chips that are placed on Host Bus Adapters, computer motherboards, RAID controllers, and the like. These chips may have multiple microprocessors and a program store for operating instructions.

RAID controllers may also be adapted to embody aspects of the invention. These hardware devices are basically specialty computers with cache memory dedicated to I/O caching. They frequently contain an operating system and local memory with traditional caching techniques.

Aspects of the invention may be embodied in a Network Attached Storage device (NAS). Incorporating the caching system and method described herein into a NAS may reduce physical I/O delays. Yet another specialty computer, the NAS device has network connectivity to clients with storage backend.

Aspects of the invention may be embodied in fabric switches to increase the performance of the fabric or of selected channels to provide differentiated Quality of Service (QOS).

Aspects of the invention may be embodied in set-top boxes and other consumer data flow and storage devices to reduce the delay in slower media.

It will be readily understood that aspects of the invention may be implemented in software, in hardware, or in some combination thereof without departing from the spirit or scope of the invention.

Other advantages will become apparent from the following detailed description when taken in conjunction with the drawings, in which:

DETAILED DESCRIPTION

In the following detailed description of exemplary embodiments of the invention, reference is made to the accompanied drawings, which form a part hereof, and which are shown by way of illustration, specific exemplary embodiments of which the invention may be practiced. These embodiments are described in sufficient detail to enable those skilled in the art to practice the invention, and it is to be understood that other embodiments can be utilized, and other changes can be made, without departing from the spirit or scope of the present invention. The following detailed description is, therefore, not to be taken in a limiting sense, and the scope of the present invention is defined by the appended claims.

Throughout the specification and claims, the following terms take the meanings explicitly associated herein, unless the context clearly dictates otherwise.

The term "or" is an inclusive "or" operator, and is equivalent to the term "and/or", unless the context clearly dictates otherwise.

The term "based on" is not exclusive and allows for being based on additional factors not described, unless the context clearly dictates otherwise.

The term "network" includes any method or medium for transmitting information from one device to another, unless the context clearly dictates otherwise. A network may interconnect computer devices and storage devices and switches, routers or hubs (sometimes referred to as a storage area network). A network may interconnect devices that are relatively local to each other (sometimes referred to as a local area network), devices that are relatively spread out with respect to each other (sometimes referred to as a wide area network), or some combination thereof. A network may include wired or wireless communication links. A widely recognized network is the Internet which connects millions of devices around the world.

Figure 1:
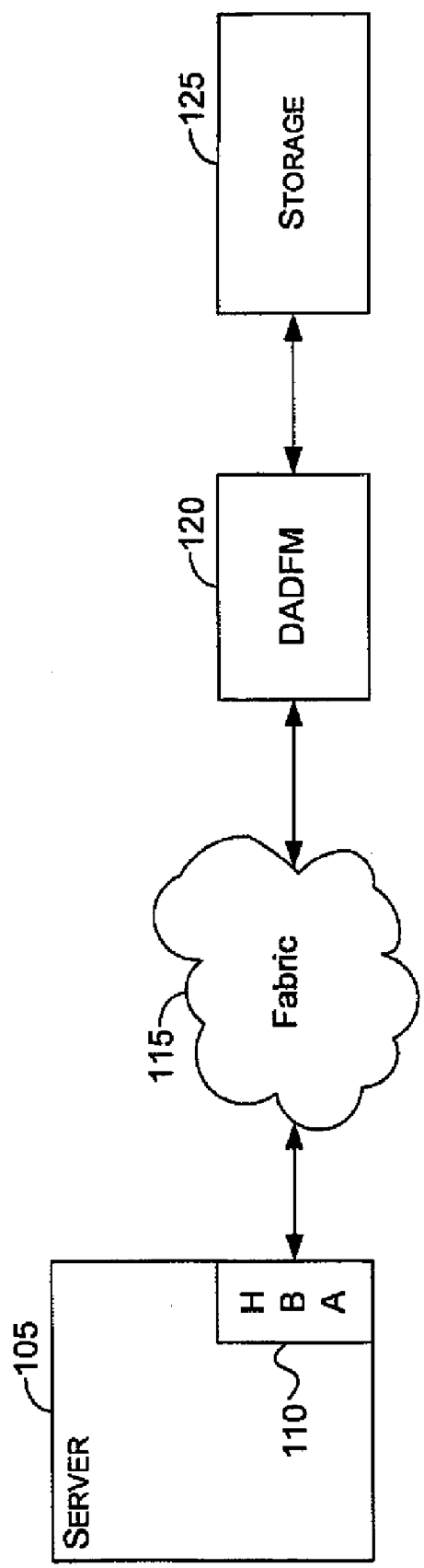
FIG. 1 is a block diagram representing an exemplary environment in which the invention may be practiced in accordance with various aspects of the invention.

FIG. 1 is a block diagram representing an exemplary environment in which the invention may be practiced in accordance with various aspects of the invention. The environment includes server 105, fabric 115, data-aware data flow manager 120 (which can contain one or more data-aware caches) and storage 125. The devices shown in the environment are interconnected by a network having communication links. In some embodiments of the invention, data-aware data flow manager 120 is incorporated in server 105, or fabric 115, or storage 125. In other embodiments of the invention, data-aware data flow manager 120 and storage 125 are incorporated in server 105. Data-aware data flow manager 120 may be incorporated at multiple places within the environment. For example, data-aware data flow manager may be incorporated on server 105 or storage 125 in addition to, or alternatively from, being inserted between fabric 115 and storage 125.

The communication links shown represent any medium capable of transmitting information. In some embodiments of the invention, one or more communication links are fiber channels. Fiber channels may be used, for example, when it is known or expected that there will be a need for a lot of bandwidth. It will be recognized, however, that any type of communication link may be used without departing from the spirit or scope of the invention.

Server 105 comprises a device or process that provides services. In general, server 105 receives requests from one or more clients and performs a service for the requesting client. Server 105 may, for example, provide Web pages, files, database access, audio or video streams, electronic messages, or other services for clients. At times, server 105 may also take on one or more roles of a client in requesting data or services from another wired or wireless device. Server 105 may include a plurality of host bust adapters 110. Host bust adapter 110 provides an interface to a communication link for communicating with other devices (e.g., storage 125 via fabric 115 and data-aware data flow manager 120).

Server 105 may include an operating system and memory. Server 105 may use part of its memory as a cache. This may be done, for example, in an attempt to avoid the latencies involved with sending data to or requesting data from storage 125. When the cache includes the data requested (i.e., a "cache hit" occurs), a data read may be accomplished much faster than going to storage 125.

Fabric 115 represents a network connecting server 105 and data-aware data flow manager 120. It should be understood that fabric 115 may include routers, switches, or other devices (not shown) for routing data between server 105 and data-aware data flow manager 120. Fabric 115 may also be connected to and provide access to other devices (not shown). In some embodiments of the invention, fabric 115 is not included; rather server 105 either includes the storage or is directly connected to the storage through a communication link.

Data-aware data flow manager 120 is a device or process that intelligently caches or does not cache data, depending on a variety of factors. A method and system of intelligently caching data is described in more detail in U.S. Provisional patent application Ser. No. 10/730,383, entitled "Data-Aware Data Flow Manager" (hereinafter "the DADFM application"), assigned to the assignee of the present invention and hereby incorporated by reference in its entirety. Briefly, when data-aware data flow manager 120 receives data that needs to be written to storage 125 or data that has been retrieved from storage 125, data-aware data flow manager 120 may decide to cache the data or send the data through without caching the data.

Storage 125 includes any computer-readable media which stores data. Computer storage media can include volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can store the information and that can be accessed by a computing device. Most commonly, storage 125 will be some sort of mass storage device, such as one or more hard disk drives.

In data center implementations, storage 125 may be configured, for example, as a redundant array of inexpensive disks (RAID) which include a controller, as just a bunch of disks (JBOD), or in some other configuration. In implementations in which the storage is included in server 105, storage 125 may comprise one or more hard drives. It will be recognized that the type of storage 125 may vary depending on application without departing from the spirit or scope of the present invention.

Each computing device mentioned herein (e.g., server 105, data-aware data flow manager 120, and the like) may be implemented on or by any device capable of executing instructions. Such devices may include, for example, computers, network appliances, multiprocessor systems, microprocessor-based or programmable consumer electronics, network PCs, cell phones, smart phones, pagers, radio frequency (RF) devices, infrared (IR) devices, CBs, personal digital assistants (PDAs), POCKET PCs, wearable computers, integrated devices combining one or more of the preceding devices, embedded microprocessors, and the like.

Figure 2:
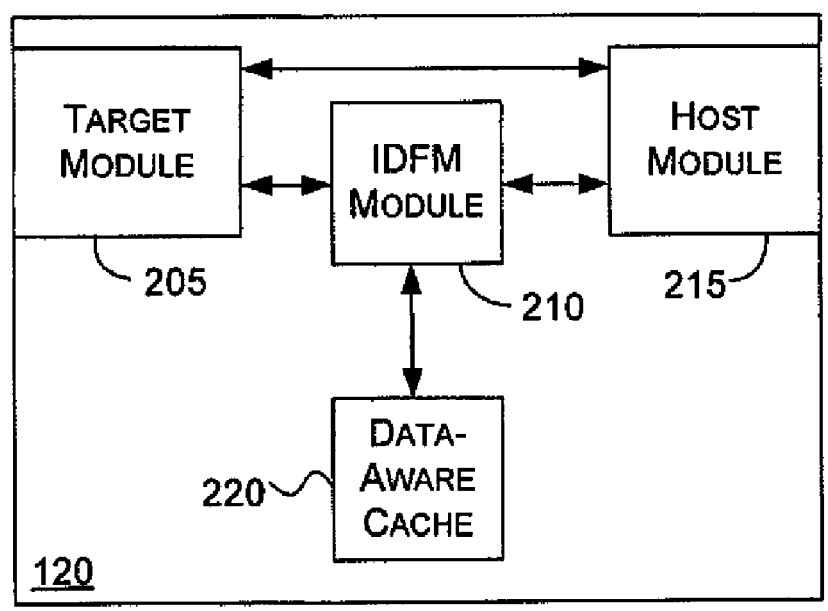
FIG. 2 is a block diagram representing an exemplar environment in which the invention may be practiced in accordance with various aspects of the invention.

FIG. 2 is a block diagram representing an exemplary environment where a data-aware cache 220 interacts with an intelligent data flow manager (IDFM) module 210, in accordance with some aspects of the invention. In the data path there is a target module 205, and a host module 215. Data-aware cache 220 is not in the data path.

Target module 205 includes logic and protocols needed to make data-aware data flow manager 120 appear as a target device. Thus, a server (not shown) having a host bus adapter can communicate with data-aware data flow manager 120 via target module 205 as if data-aware data flow manager 120 were a storage device. Generally, target module 205 acts as an interface to a requester.

Similarly, host module 215 includes logic and protocols needed to make data-aware data flow manager 120 appear as a host device. Thus, data-aware data flow manager 120 can communicate with a storage device (or other downstream device) as if data-aware data flow manager 120 were a host device. Generally, host module 215 acts as an interface to storage device (or other downstream device).

IDFM module 210 is used to make various decisions with respect to data passing through data-aware data flow manager 120. Among its tasks, IDFM module 210 determines whether data should be piped directly through data-aware data flow manager 120 (e.g., directly from target module 205 to host module 215), or whether the data should be cached in data-aware cache 220. Details of an exemplary data-aware data flow manager's decision making process are described in the DADFM application and will not be described in more detail here.

Data-aware cache 220 stores and retrieves data in accordance with instructions from IDFM module 210. Data-aware cache 220 may be implemented in any type of memory, volatile or non-volatile. The internals of data-aware cache will be described further below.

Figure 3:
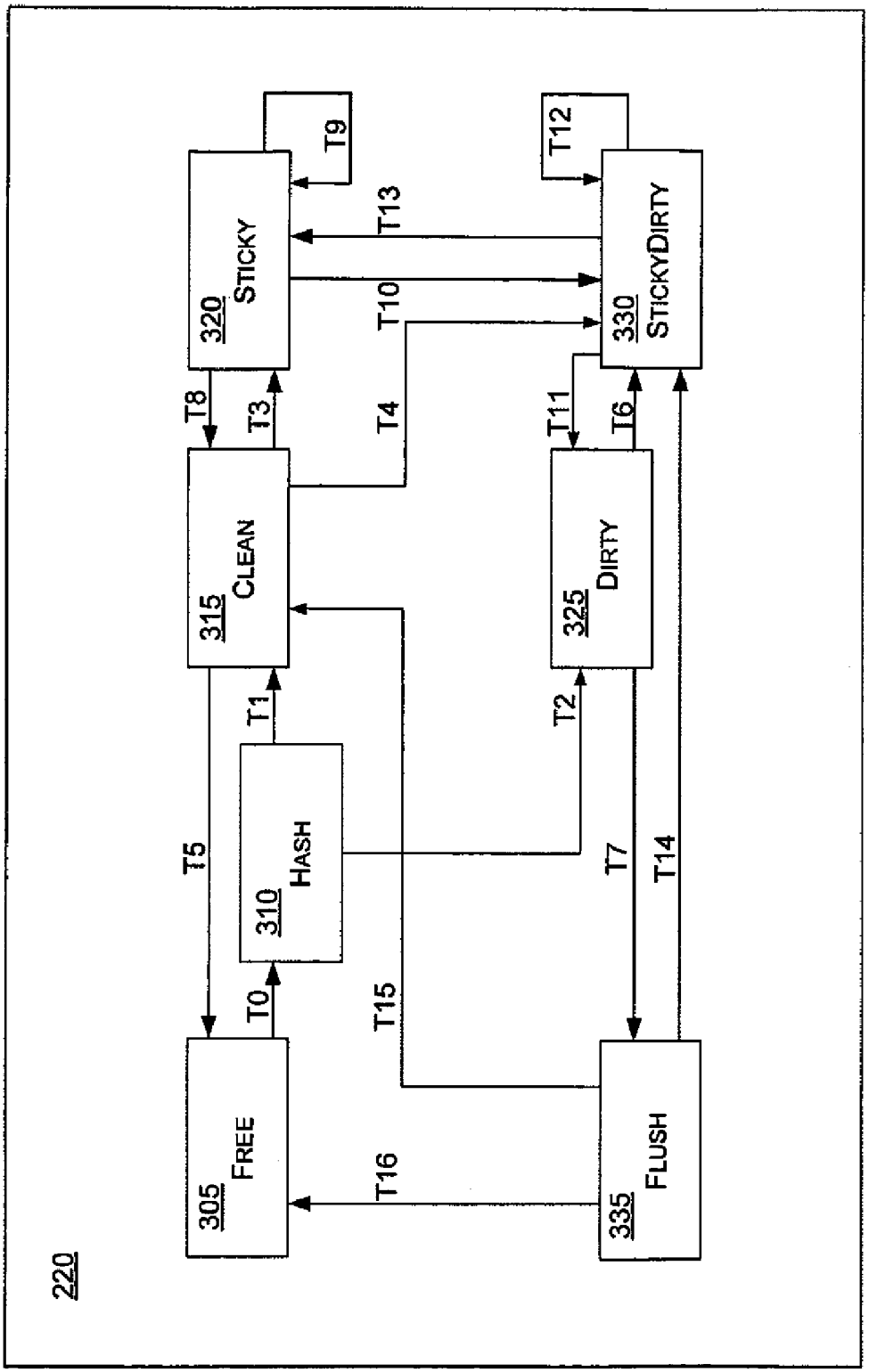
FIG. 3 is a block diagram representing an exemplary state machine of a data-aware cache in accordance with some aspects of the invention.

FIG. 3 is a block diagram representing an exemplary state machine of a data-aware cache in accordance with various aspects of the invention. The data-aware cache 220 includes Free state 305, Hash state 310, Clean state 315, Sticky state 320, Dirty state 325, StickyDirty state 330, and Flush state 335. The data-aware cache also defines a set of allowed transitions from T0 to T16.

Each data-aware cache state has a DACLineControl structure. Each cache line inside the data-aware cache has a LineControlBlock (LCB) structure associated with it. Each LCB structure comprises a set of attributes, including but not limited to, AccessCount that indicate the number of accesses to the cache line and Flags that indicate the cache line's clean or dirty state. The LCB structure is described in more detail in conjunction with FIGS. 4A and 4B.

Free state 305 holds a set of free cache lines available for use by host reads or writes via the intelligent data flow manager 210. In general, none of the free cache lines contain valid data. Each free cache line's state is set to FREE, which is the initial state upon cache creation. Free state 305 may be used implement a lower threshold signaling mechanism. When the number of free cache lines is less than the threshold, the data-aware cache 220 may send a notification to IDFM 210. IDFM 210 can then decide whether a flush should be started, based on the state of cache and in conjunction with the system load condition. Free state 305 may, but is not required to be used to implement an upper threshold signaling mechanism, as this may be determined by the size of cache. Free state 305 is allowed to interact with Hash state 310, Clean state 315, and Flush state 335.

Clean state 315 manages a set of clean cache lines that are used by a host read request. The clean cache lines may be used by such a request only once or a number of times less than or equal to an access threshold. The access count of any cache line in Clean state 315 may be set to one (or a number less than the access threshold). The clean cache lines Clean state 315 manages contain valid data and the state of these cache lines is CLEAN. Clean state 315 may organize its cache lines into an LRU (least recent used) list. Clean state 315 does not need to have either upper or lower threshold. It is not an error condition if Clean state 315 has zero cache line. This simply means that all cache lines are populated among other states in the data-aware cache 220. Clean state 315 is allowed to interact with Free state 305, Hash state 310, Sticky state 320, StickyDirty state 330 and Flush state 335.

Sticky state 320 manages a set of clean cache lines that are used by a number of host read requests. The clean cache lines may be used by such requests more than once or a number of times greater than or equal to an access threshold. The access count of any cache line in Sticky state 320 may be set equal to the number of times the line has been accessed. These clean cache lines contain valid data and the state of these cache lines is STICKY. The name STICKY comes from the fact that these cache lines will not be easily replaced by classical LRU replacement policy. Since all cache lines in the Sticky state 320 have been accessed multiple times, they contain hot data. They "stay," or "stick around," in cache longer than those cache lines in the Clean state 315. Sticky state 320 may organizes its cache lines into an LRU (least recent used) list. Ideally, Sticky state 320 will have an upper threshold. Otherwise, all cache lines may end up in Sticky state 320 and no cache lines may be left to serve new reads or writes. When the Sticky state 320 upper threshold is reached or exceeded, one or more least recently used sticky cache lines may be transitioned to Clean state 315. These transitioned lines may be marked as most recently used in Clean state 315. Sticky state 320 does not need to have a lower threshold, as it is not an error condition if Sticky state has zero cache lines. Having zero cache lines may simply mean that no clean cache lines have been accessed twice. Sticky state 320 is allowed to interact with Clean state 315, Sticky state 320, and StickyDirty state 330.

Dirty state 325 manages a set of dirty cache lines that are used by a host write or read request. The direct cache lines may be used by such a request only once or a number of times less than or equal to an access threshold. The access count of any cache line in the Dirty state may be set to one (or a number less than the access threshold). These dirty cache lines contain valid data that have not been committed to the permanent physical storage. They need to be flushed to the physical storage at a later time. The state of these cache lines is set to DIRTY. Dirty state 325 may organize its cache lines into an LRU (least recent used) list. Ideally, Dirty state 325 will have an upper threshold and may have a lower threshold. The upper threshold is useful to control the number of dirty lines in Dirty state 325. The upper threshold may be used to trigger a flush of dirty cache lines. The lower threshold may be used to stop the flush when the lower threshold is reached. However, it is not necessary to have a lower threshold. It is not an error condition if Dirty state 325 has zero cache lines. Dirty state 325 is allowed to interact with Hash state 310, StickyDirty state 330, and Flush state 335.

StickyDirty state 330 manages a set of dirty cache lines that are used by a number of combination of host read and write requests and at least one write request. The dirty cache lines may used by such requests more than once or a number of times greater than or equal to an access threshold. The access count of any cache line in StickyDirty state 330 may be set to equal to the number of times the line has been accessed. These dirty cache lines contain valid data that have not been committed to the permanent physical storage. The dirty cache lines need to be flushed to the physical storage at a later time. The state of these cache lines is set to STICKYDIRTY. The name STICKYDIRTY is a combination of sticky and dirty. Similar to Sticky state 320, these dirty cache lines in StickyDirty state 330 are not flushed out by a classical LRU replacement policy. Since all cache lines in the StickyDirty state 330 have been accessed multiple times, they contain hot data. The cache lines in the StickyDirty state 330 "stay," or "stick around" in cache longer than those cache lines in Clean state 315 or Dirty state 320. StickyDirty state 320 may organize its cache lines into an LRU (least recent used) list. Ideally, StickyDirty state 320 will have an upper threshold. Otherwise, all available cache lines may end up in StickyDirty state 330 leaving no cache lines to serve new reads or writes. When the StickyDirty state 330 upper threshold is reached or exceeded, one or more least recent used sticky-dirty cache lines will be transitioned to Dirty state 325. These may be marked as most recently used in Dirty state 325. The upper threshold is also useful to control the number of dirty lines in StickyDirty state 330. Sticky state 330 does not need to have a lower threshold, as it is not an error condition if StickyDirty state 330 has zero cache lines. Having zero cache lines may simply mean that no dirty cache lines have been accessed twice. StickyDirty state 330 is allowed to interact with Clean state 315, Sticky state 320, Dirty state 325, StickyDirty state 330, and Flush state 335.

Flush state 335 manages a set of dirty cache lines that are about to be flushed or written to permanent physical storage.

Flush state 335 contains dirty cache lines transitioned out of Dirty state 325. Flush state 335 may contain some or all lines from Dirty state 325, based on policies set by user and/or input from IDFM 210. Flush state 335 is useful to manage the pace of flushing cache line entries. The state of cache lines in Flush state 335 is set to FLUSH. Flush state 335 may organize its cache lines into an LRU (least recent used) list. Flush state 335 does not need to have an upper threshold or lower threshold. It is not an error condition if Flush state 335 has zero cache lines. Flush state 335 is allowed to interact with Free state 305, Clean state 315, Dirty state 325, and StickyDirty state 330.

Hash state 310 is a transient state for free cache lines en route to either Clean state 315 or Dirty state 325. As free cache lines contain no valid data and both Clean state 315 and Dirty state 325 each require that cache lines contain valid data, Hash state 310 provides an intermediate stop where the free lines can stay until valid data arrives. When valid data arrives, IDFM 210 will notify data-aware cache 220 which cache lines now have valid data. Then, the data-aware cache transitions these lines to either Clean state 315 or Dirty state 325 and updates the cache state. Hash state 310 may also be used to implement a hash table and insert the free lines into the hash table upon their initial use. Hash state 310 may use any hash algorithm known to those of ordinary skill in the art. However, one important aspect of hashing is collision resolution. A double-linked list may be used for this very purpose.

One unique aspect of this invention is that the hash collision resolution list may also be a LRU list. Common cache replacement policy may be based on LRU for its simplicity. Hash state is allowed to interact with Free state 305, Clean state 315, and Dirty state 325.

It should be understood that data-aware cache can have more than 7 states and use other data attributes to populate and manage other custom states in the same way as Sticky state 320 and StickyDirty state 330. Other exemplary data attributes may include an XML tag, a type of metadata, a type of file extension, and on the like. These attributes may be associated with a type of content or application. Using these attributes data-aware cache may treat data with these attributes differently, and thus, make the cache content-aware or application-aware.

The state machine of a data-aware cache shown in FIG. 3 also defines a set of state transitions. These transitions provide a collection of the events, actions and algorithms which determine how the data-aware cache operates. The transitions are described here in detail.

Transition T0 is from Free state 305 to Hash state 310. T0 occurs when a host read or write request has routed to cache, a cache miss occurs, and free lines are available. The free cache line is inserted into hash table 310 and is used to receive read or write data. Other cache states are also adjusted accordingly (e.g. Free state 305's count may decrement by 1, and Hash state 310's count may increment by 1).

Transition T1 is from Hash state 310 to Clean state 315. T1 occurs when a free line is already in Hash state 310, a cache miss occurs, and a host read request has fetched data from physical storage. The free cache line is transitioned to the most recent used (MRU) position of Clean state 315's LRU list, its access count is incremented to 1, its state is set to CLEAN, and its IsDataValid is set properly. Other cache states are also adjusted accordingly (e.g., Clean state 315's count may be incremented by 1 and Hash state 310's count may be decremented by 1). A data pointer may be set to the cache line and data returned to host via the data pointer.

Transition T2 is from Hash state 310 to Dirty state 325. T2 occurs when a free line is already in Hash state 310, a cache miss occurs, and a host write request has received data from the host. The free cache line is transitioned to the most recent used (MRU) position of the Dirty state 325's LRU list, its access count is incremented by 1, its state is set to DIRTY, its Flags indicating dirtiness are set properly, and its IsDataValid is set properly. Other cache states are also adjusted accordingly (e.g., Dirty state 325's count may be incremented by 1; and Hash state 310's count may be decremented by 1). In addition, a message may be sent to the host indicating the write is completed.

Transition T3 is from Clean state 315 to Sticky state 320. T3 occurs when a cache hit in Clean state 315 occurs and a host read request has routed to cache. The clean cache line is transitioned to the MRU position of the Sticky state 320's LRU list, its access count is incremented by 1, and its state is set to STICKY. Other cache states are adjusted accordingly (e.g., Clean state 315's count may be incremented by 1; and Hash state 310's count may be decremented by 1). In addition, a data pointer is set to the cache line and data is returned to host via the data pointer.

Transition T4 is from Clean state 315 to StickyDirty state 330. T4 occurs when a cache hit in Clean state 315 occurs and a host write request has routed to cache. The clean cache line is transitioned to the MRU position of the StickyDirty state 330's LRU list, its access count is incremented by 1, its state is set to STICKYDIRTY, and its Flags indicating dirtiness are set properly. Other cache states are adjusted accordingly (e.g., Clean state 315's count may be decremented by 1; and StickyDirty state 330's count may be incremented by 1). In addition, a message may be sent to the host indicating the write is completed.

Transition T5 is from Clean state 315 to Free state 305. T5 occurs when a host read or write request has routed to cache, a cache miss occurs, and no free lines are available. A clean cache line is evicted from the least recent used (LRU) position of the Clean state 315's LRU list, removed from hash table, and is recycled to Free state 305. The cache line's state is reset to FREE along with other attributes (e.g., access count set to 0 and IsDataValid set to 0). Other cache states are also adjusted accordingly (e.g., Free state 305's count may be incremented by 1; and Clean state 315's count may be decremented by 1). Then, the cache line is used to serve the new host read or write request.

Transition T6 is from Dirty state 325 to StickyDirty state 330. T6 occurs when a cache hit in Dirty state 325 occurs and a host write request has routed to cache. The dirty cache line is transitioned to the MRU position of StickyDirty state 330's LRU list, its access count is incremented by 1, its state is set to STICKYDIRTY, and its Flags indicating dirtiness are updated properly. Other cache states are also adjusted accordingly (e.g. Dirty state 325's count may be decremented by 1; and StickyDirty state 330's count may be incremented by 1). In addition, a message may be sent to the host indicating the write is completed.

Transition T7 is from Dirty state 325 to Flush state 335. T7 occurs when the cache's dirty upper threshold is reached (after a host write request to cache). A least recent used dirty cache line is transitioned to the MRU position of Flush state 335's LRU list, and its state is set to FLUSH. Other cache states are adjusted accordingly (e.g., Dirty state 325's count may be decremented by 1; and Flush state 335's count may be incremented by 1). Normally, more than 1 dirty cache lines can be transitioned to Flush state 335 at a time. In addition, a message is sent to IDFM 210 indicating that the cache may need to be flushed.

Transition T8 is from Sticky state 320 to Clean state 315. T8 occurs when the cache's sticky upper threshold is reached or exceeded (after a host read request to cache and cache hit). A least recent used sticky cache line is transitioned to the MRU position of Clean state 315's LRU list, and its state is set to CLEAN. Other cache states are adjusted accordingly (e.g., Sticky state 320's count may be decremented by 1; and Clean state 315's count may be incremented by 1). Normally, more than 1 sticky cache lines can be transitioned to Clean state 315 at a time to bring the sticky line count below the upper threshold.

Transition T9 is a self transition from Sticky state 320 to Sticky state 320. T9 occurs when a host read request to cache hits a cache line in Sticky state 320. The sticky cache line is moved from whatever position in Sticky state 320's LRU list to the MRU position of Sticky state's LRU list, and its access count is incremented by 1. In addition, a data pointer is set to the cache line, and data is returned to host via the data pointer.

Transition T10 is from Sticky state 320 to StickyDirty state 330. T10 occurs when a cache hit to a cache line in Sticky state 320 occurs and a host write request has routed to cache. The sticky cache line is transitioned to the MRU position of the StickyDirty state 320's LRU list, its access count is incremented by 1, its state is set to STICKYDIRTY, and its Flags indicating dirtiness are set properly. Other cache states are also adjusted accordingly (e.g., Sticky state 320's count may be decremented by 1; and StickyDirty state 330's count may be incremented by 1). In addition, a message is sent to the host indicating the write is completed.

Transition T11 is from StickyDirty state 330 to Dirty state 325. T11 occurs when cache's sticky-dirty upper threshold is reached or exceeded (after a host write request to cache and cache hit). A least recently used sticky-dirty cache line is transitioned to the MRU position of Dirty state 325's LRU list, and its state is set to DIRTY. Other cache states are adjusted accordingly (e.g. StickyDirty state 330's count may be decremented by 1; and Dirty state 325's count may be incremented by 1). Normally, more than 1 sticky-dirty cache lines can be transitioned to Dirty state at a time to bring the sticky-dirty line count below the upper threshold. T11 can also happen when all dirty cache lines need to be flushed (e.g., when system shut down or power out emergency).

Transition T12 is a self transition from StickyDirty state 330 to StickyDirty state 330. T12 occurs when a host write request to cache hits a cache line in StickyDirty state 330. The sticky-dirty cache line is moved from whatever position in StickyDirty state 330's LRU list to the MRU position of StickyDirty state 330's LRU list, and its access count is incremented by 1. In addition, a message is sent to the host indicating the write is completed.

Transition T14 is from Flush state 335 to StickyDirty state 330. T14 occurs when a host read or write request to cache hits a cache line in Flush state 335 and the cache line has not yet been written to physical storage. The transition T14 will bring the cache line from Flush state 335 to the MRU position of the StickyDirty state's LRU list. The cache line state is set to STICKYDIRTY, its Flags indicating dirtiness are updated properly, and its access count is incremented by 1. Other cache states are adjusted accordingly (e.g., StickyDirty state 330's count may be incremented by 1; and Flush state 335's count may be decremented by 1). A data pointer is set to the cache line and data is returned to the host via the pointer, if the request is read. Alternatively, a message is sent to the host indicating the write is completed, if the request is write.

Transition T13 is from StickyDirty state 330 to Sticky state 320. T13 occurs when a host read request to cache hits a cache line in Flush state 335 and the cache line is in the middle of being written to physical storage. The transition T14 will bring the cache line from Flush state 335 to StickyDirty state 330. Upon completion of the write to physical storage, the cache line in StickyDirty state 330 is now CLEAN, its Flags indicating dirtiness are reset to zero, it is transitioned to the MRU position of the Sticky state 330's LRU list, its state is set to STICKY, and its access count is incremented by 1. Other cache states are adjusted accordingly (e.g., StickyDirty state 330's count may be decremented by 1; and Sticky state 320's count may be incremented by 1). In addition, a data pointer is set to the cache line and data is returned to host via the data pointer.

Transition T15 is from Flush state 335 to Clean state 315. T15 occurs when after a flush completed, the cache line is retained in cache and is transitioned to the MRU position of the Clean state's LRU list. Normally, one wants to do this if the cache line contains hot data, i.e., the access count of the cache line is greater than 1. The cache line state is set to CLEAN, and its Flags indicating dirtiness are reset to zero. Other cache states are adjusted accordingly (e.g., Clean state 315's count may be incremented by 1; and Flush state 335's count may be decremented by 1).

Transition T16 is from Flush state 335 to Free state 305. T16 occurs after a flush completed. Then, the cache line is recycled, removed from hash table, and returned to Free state 305. Normally, one wants to do this if the cache line was accessed only once. The cache line state is set to FREE and other attributes are all reset to its initial values. Other cache states are adjusted accordingly (e.g., Free state 305's count may be incremented by 1; and Flush state 335's count may be decremented by 1).

Figure 4A:
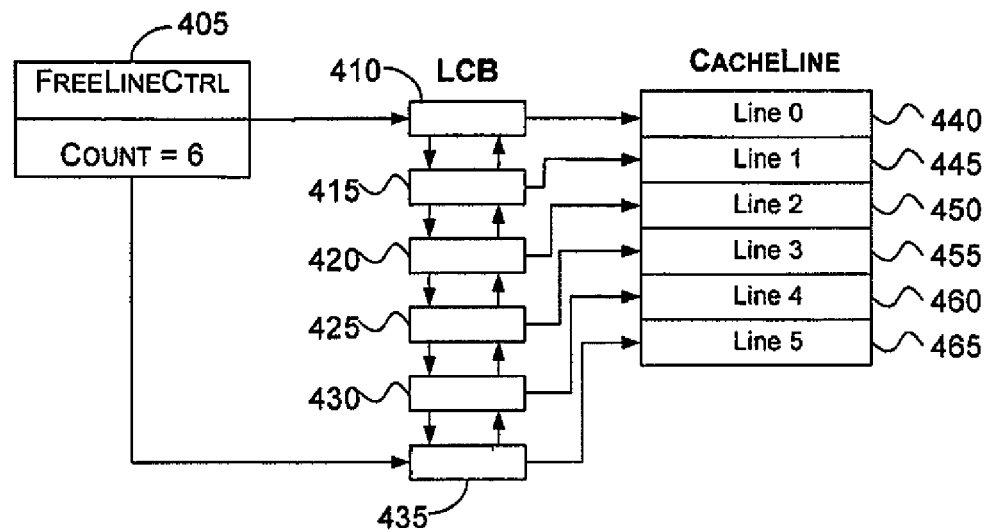
FIG. 4A illustrates details of the structures of a state of a data-aware cache and the interfaces among these data structures in accordance with various aspects of the invention.

FIG. 4A illustrates details of the structures of a state of a data-aware cache and the interfaces among these data structures in accordance with various aspects of the invention. FreeLineCtrl 405 is an exemplary DACLineCtrl data structure. In one form, it contains a head pointer that points to the MRU end of the Free state 305's LRU list, a tail pointer that points to the LRU end of the Free state 305's LRU list, and a count that keeps track of how many LineCtrlBlock (LCB) structures are in the LRU list. Blocks 410 through 435 depicts 6 LCBs, implemented as a double linked list and organized as a LRU list. Each LCB structure contains a line pointer that points to a cache line, represented by blocks 440 through 465. Each cache line is a number of one or more memory blocks. FIG. 4A also illustrates a FreeLineCtrl structure. It should be understood that other data-aware cache states may also be constructed in a similar manner. For example, Clean state 315 has a CleanLineCtrl data structure; Dirty state 325 has a DirtyLineCtrl data structure, etc. Each data structure corresponding to a state may be constructed in a manner similar to that shown in FIG. 4A. It should also be understood that DACLineCtrl data structures is exemplary only. It may also contain more attributes such as upper and lower thresholds, maximum residence time, average or maximum access count, and the like and may use smart pointers instead of primitive pointers and the like without departing from the spirit or scope of the invention.

Figure 4B:
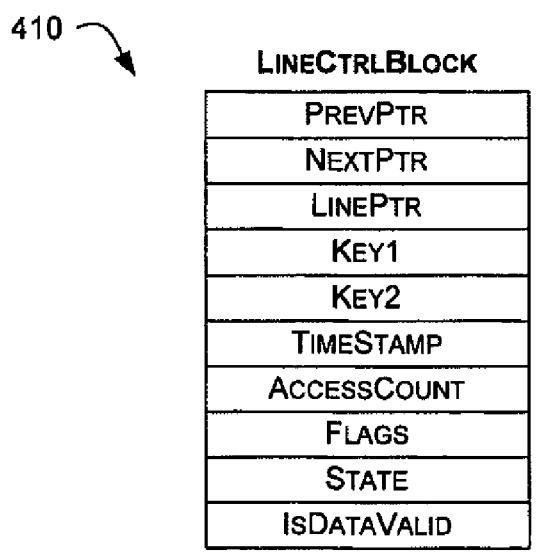
FIG. 4B is a block diagram showing a more detailed view of an exemplary LineCtrlBlock (LCB) data structure of a data-aware cache in accordance with various aspects of the invention.

FIG. 4B is a block diagram showing a more detailed view of an exemplary LineCtrlBlock (LCB) 410 data structure of a data-aware cache in accordance with various aspects of the invention. The Prev and Next pointers may be used for implementing a double linked list. The line pointer may be used to point to a cache line. The pair of keys (Key1 and Key2) may be used for hashing and uniquely identifying the location of the data in the cache line. The TimeStamp attribute may be used in DirtySticky state 330. In one implementation, the TimeStamp is set when a cache line first transitions to Dirty-Sticky state. Later, system time can be compared with the TimeStamp to arrive a time delta. If the time delta is greater than a threshold (which may be set by user policy or by other means), then the dirty-sticky cache line should be flushed to disk soon. This mechanism may help to ensure that no cache line, especially a dirty line, stays in cache forever. The access count of cache lines in Free state 305 may be zero and may be one in Clean state 315 or Dirty state 325 (or a number below an access threshold). If upon access, the access count of a line is increased equal to or greater than the access threshold, then the cache line is transitioned to either Sticky state 320 or StickyDirty state 330. It will be recognized that once a cache line is in Sticky state 320 or StickyDirty state 330, a simple LRU replacement algorithm will not get rid of them easily. Since the cache line has been accessed multiple times, it contains hot data and should be kept in cache longer. Sticky state 320 and StickyDirty state 330 exist, at least in part, to retain the cache line that contains hot data longer in cache. Moreover, separately managed hot clean and hot dirty data can lead to better flush management and longer cache resident time for those lines in Sticky state 320. The Flags are primarily for signaling whether the cache line contains dirty data or which memory blocks in the cache line contains dirty data. The state of each cache line should be set properly to reflect the state the cache line is in. IsDataValid is primarily for signaling whether the cache line contains valid data or which memory blocks in cache line contain real data. It should be understood that the LCB data structure is exemplary. One may add or subtract attributes in the LCB data structure or use smart pointers instead of primitive pointers without departing from the spirit or scope of the present invention. In systems with relatively large amounts of memory, one may add more attributes to LCB to gain finer control of cache lines. In systems with relatively small amounts of memory, one may use a simpler LCB structure to conserve memory. Also, each of the attributes of the LCB structure is not required to take up the same amount of memory as any of the other attributes. For example, the Flags attribute could be a 4-byte or 1-byte attribute. It will be understood that these and other variations may be made without departing from the spirit or scope of the present invention.

Figure 5:
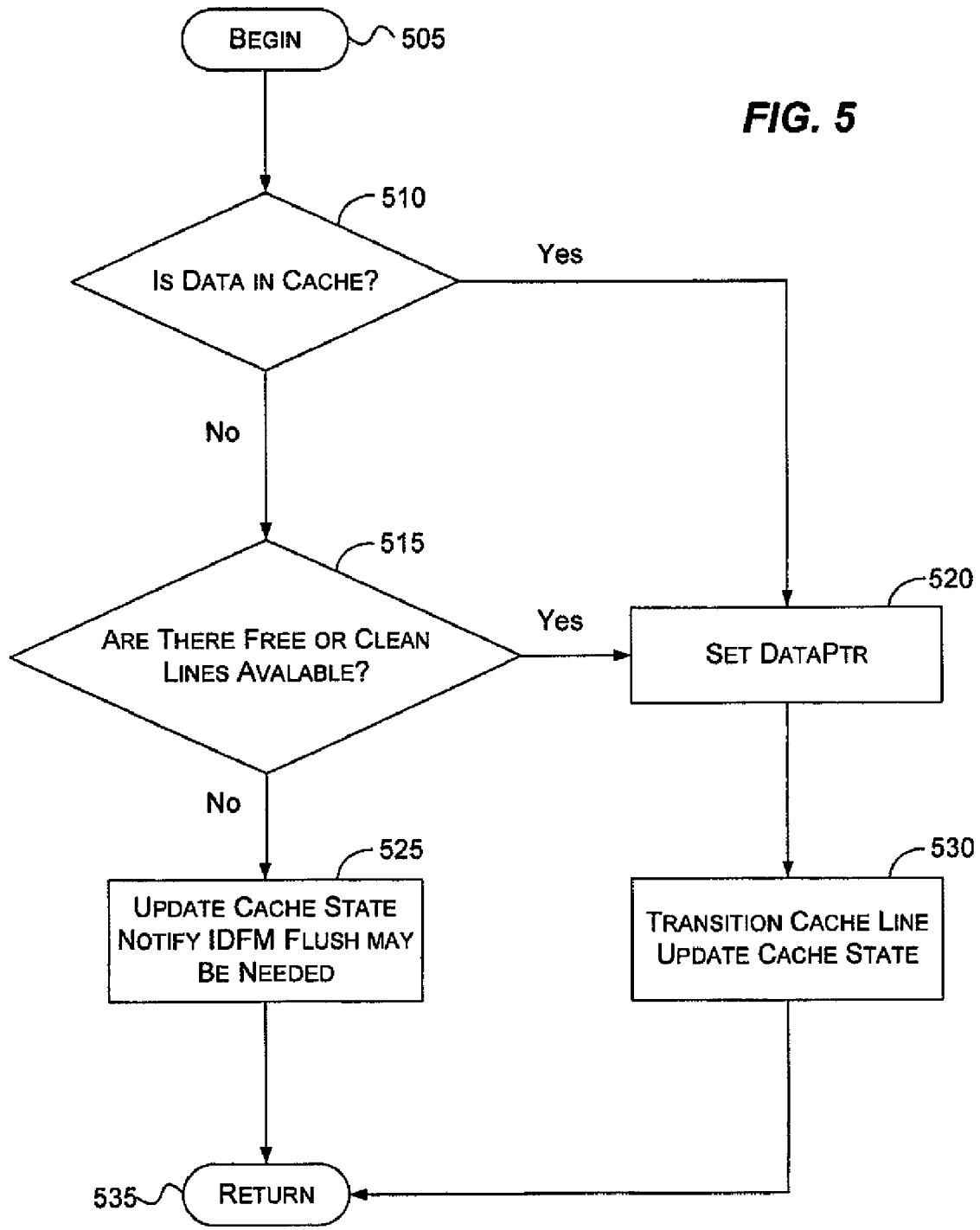
FIG. 5 is a dataflow diagram that generally represents exemplary steps that may occur when a data-aware cache responds to a read or write request from a host in accordance with various aspects of the invention.

FIG. 5 is a dataflow diagram that generally represents exemplary steps that may occur when a data-aware cache responds to a read or write request from a host in accordance with various aspects of the invention. The process begins at block 505.

At block 510, a read or write request arrives. The data-aware cache determines whether the data (or the cache line, when a write request) is in cache. If yes, the processing continues at block 520. Otherwise, processing continues at block 515.

At block 515, the data-aware cache determines whether the cache has enough free or clean lines to handle the request. If yes, the cache line will be used to serve the read or write request, and processing continues at block 520. Otherwise, processing continues at block 525.

At block 520, the data-aware cache responds to the request by setting a data pointer. At block 525, the data-aware cache updates states and notifies IDFM 210. One of the messages data-aware cache passes to IDFM is if the cache needs to be flushed.

At block 530, the cache line or lines are transitioned to reflect the most recent host request and update cache states.

At block 535, the process ends or returns to a calling process.

Figure 6A:
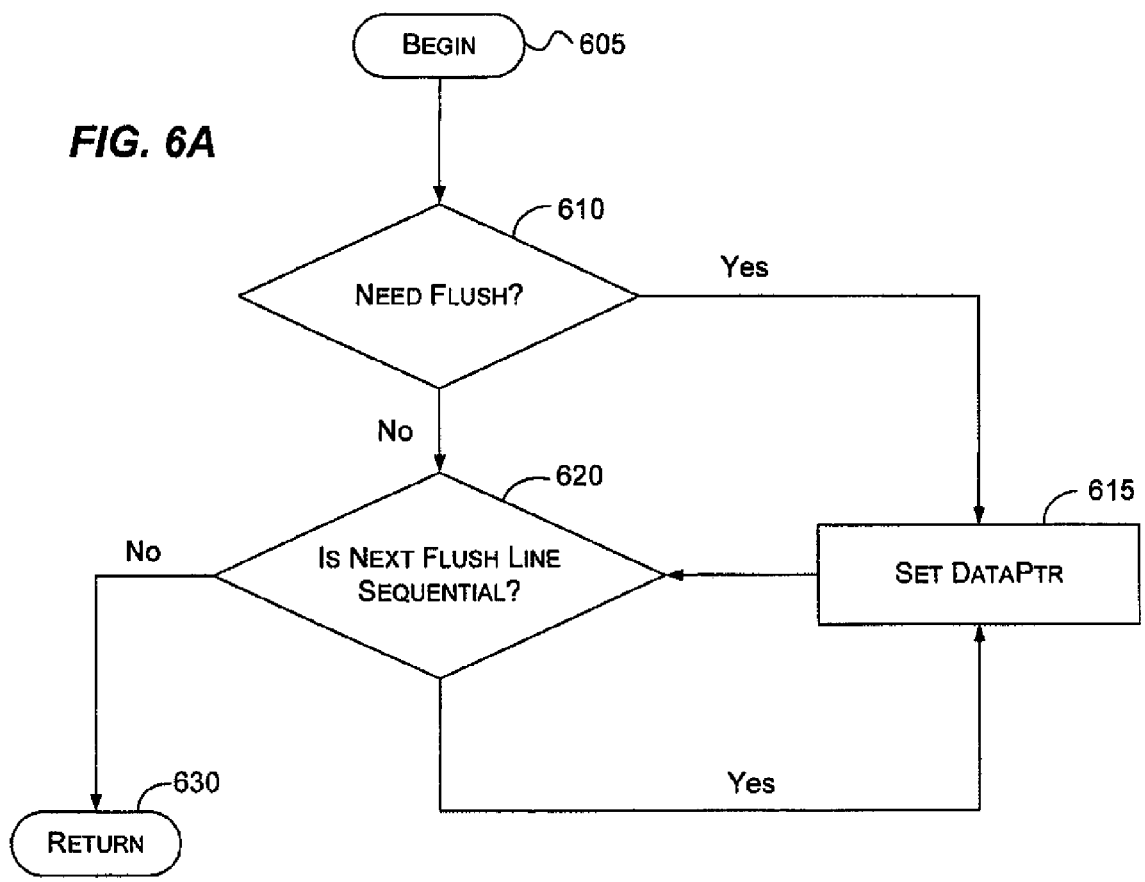
FIG. 6A is a dataflow diagram that generally represents exemplary steps that may occur during a flush of the cache in accordance with various aspects of the invention.

FIG. 6A is a dataflow diagram that generally represents exemplary steps that may occur during a flush of the cache in accordance with various aspects of the invention. The process begins at block 605.

At block 610, a determination is made as to whether a flush is needed. If a flush is needed, processing continues at block 615; otherwise, processing continues at block 620.

At block 615, the cache sets the data pointer to the cache line that is going to be flushed.

At block 620, a determination is made as to whether the next cache line in the Flush state is sequential relative to the previous line. If not, processing continues at block 630; otherwise, processing loops back to block 615, the cache sets the data pointer to the next cache line so as to combine two or more cache lines in one write. The loop can combine several consecutive cache lines into one flush. This will generally reduce the round trip to physical disk storage.

At block 630, the process returns to IDFM 210, with data pointers set and cache status information.

Figure 6B:
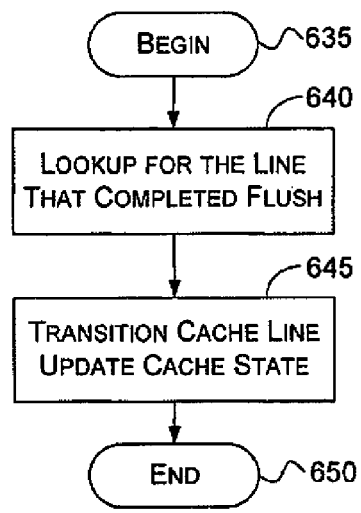
FIG. 6B is a dataflow diagram that generally represents exemplary steps that may occur after a flush has written data to persistent storage in accordance with various aspects of the invention.

FIG. 6B is a dataflow diagram that generally represents exemplary steps that may occur after a flush has written data to persistent storage in accordance with various aspects of the invention. The process begins at block 635.

At block 640, a lookup is performed to locate the cache lines just being flushed. The processing continues at block 645, where those cache lines are transitioned to their proper states and their attributes are updated properly. At block 650, processing ends.

As can be seen from the foregoing detailed description, there is provided an improved method, algorithms, and a system for intelligently caching, differentiating, and managing data flow based on data pattern, content, and application. While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

The invention claimed is:

1. A method for controlling a cache, comprising:
   managing data in the cache by assigning a state to each portion of cache data, wherein managing each portion of the cache data is enabled by a state machine comprising a plurality of states and a set of state transitions;
   associating each of the plurality of states with a control structure;
   associating each portion of the cache data with a set of attributes; and
   enabling each of the plurality of states to be aware of the cache data, wherein the plurality of states include at least:
      a Free state where the cache data contains unvalidated data;
      a Clean state where the cache data is valid and clean and no flush is required;
      a Dirty state where the cache data is valid and dirty and a flush is required;
      a Sticky state where the cache data is valid and clean and was accessed at least twice by at least one of a read operation or a write operation;
      a StickyDirty state where the cache data contains valid dirty data that was accessed at least twice by at least one of a read operation or a write operation;
      a Flush state where the cache data contains valid dirty data that is to be written to a storage device; and
      a Hash state where the cache is in the process of getting valid data from at least one of the physical storage device or a host.

2. The method of claim 1, further comprising:
utilizing a hash object to speed up cache data lookup;
enforcing a total maximum dirty data threshold;
collecting statistics for each portion of cache data including at least one of a read access count, a write access count, and a time since last flush; and
collecting statistics for the cache, including at least one of a cache hit count, a cache miss count, and an average access count.

3. The method of claim 1 wherein at least one state is treated as a separate virtual cache employing a replacement process.

4. The method of claim 1 wherein the combined states of Free state and Clean state have a minimum threshold, and wherein if the minimum threshold is exceeded, providing a request to flush a least one of a Data Flow Manager and a Flush Manager.

5. The method of claim 1 wherein the Dirty state has a maximum threshold, and wherein if the maximum threshold is exceeded, providing a request to flush to at least one of a Data Flow Manager and a Flush Manager.

6. The method of claim 1, further comprising:
enabling the Dirty state to provide a minimum threshold that enables a Data Flow manager to stop flushing before the cache data is completely flushed; and
enabling the StickyDirty state to provide a maximum threshold, wherein if the maximum threshold is exceeded, enabling a transition of one or more portions of cache data to the Dirty state, and wherein if the StickyDirty state is over the maximum threshold, providing a request to flush to at least one of a Data Flow Manager and a Flush Manager.

7. The method of claim 1, further comprising providing a request to flush to at least one of a Data Flow Manager and a Flush Manager if a time delta is greater than a time threshold.

8. The method of claim 1 wherein the Sticky state has a maximum threshold, wherein if the maximum threshold is exceeded, enabling a transition of one or more portions of cache data to the Clean state.

9. A computer readable medium with data that enables management of a cache, wherein the execution of at least a portion of the data enables actions, comprising:
assigning a state to each portion of cache data, wherein managing each portion of the cache data is enabled by a state machine comprising a plurality of states and a set of state transitions;
associating each of the plurality of states with a control structure;
associating each portion of the cache data with a set of attributes; and
enabling each of the plurality of states to be aware of the cache data, wherein the plurality of states include at least:
a Free state where the cache data contains unvalidated data;
a Clean state where the cache data is valid and clean and no flush is required;
a Dirty state where the cache data is valid and dirty and a flush is required;
a Sticky state where the cache data is valid and clean and was accessed at least twice by at least one of a read operation or a write operation;
a StickyDirty state where the cache data contains valid dirty data that was accessed at least twice by at least one of a read operation or a write operation;
a Flush state where the cache data contains valid dirty data that is to be written to a storage device; and
a Hash state where the cache is in the process of getting valid data from at least one of the physical storage device or a host.

10. The computer readable medium of claim 9, wherein the execution of at least a portion of the data enables further actions, comprising:
utilizing a hash object to speed up cache data lookup;
enforcing a total maximum Dirty data threshold;
collecting statistics for each portion of cache data including at least one of a read access count, a write access count, and a time since last flush; and
collecting statistics for the cache, including at least one of a cache hit count, a cache miss count, and an average access count.

11. The computer readable medium of claim 9, wherein at least one state is treated as a separate virtual cache employing a replacement process.

12. The computer readable medium of claim 9, wherein the combined states of Free state and Clean state have a minimum threshold, and wherein if the minimum threshold is exceeded, providing a request to flush a least one of a Data Flow Manager and a Flush Manager.

13. The computer readable medium of claim 9 wherein the Dirty state has a maximum threshold, and wherein if the maximum threshold is exceeded, providing a request to flush to at least one of a Data Flow Manager and a Flush Manager.

14. The computer readable medium of claim 9, wherein the execution of at least the portion of the data enables further actions, including:
enabling the Dirty state to provide a minimum threshold that enables a Data Flow manager to stop flushing before the cache data is completely flushed; and
enabling the StickyDirty state to provide a maximum threshold, wherein if the maximum threshold is exceeded, enabling a transition of one or more portions of cache data to the Dirty state, and wherein if the StickyDirty state is over the maximum threshold, providing a request to flush to at least one of a Data Flow Manager and a Flush Manager.

15. The computer readable medium of claim 9, wherein the execution of at least the portion of the data enables providing a request to flush to at least one of a Data Flow Manager and a Flush Manager if a time delta is greater than a time threshold.

16. The computer readable medium of claim 9, wherein the Sticky state has a maximum threshold, wherein if the maximum threshold is exceeded, enabling a transition of one or more portions of cache data to the Clean state.

17. A system for managing a cache, comprising:
a server for receiving a request for data;
a data flow manager that processes the request, including:
enabling data in the cache to be assigned a state to each portion of cache data, wherein each portion of the cache data is further enabled for use with a state machine comprising a plurality of states and a set of state transitions;
enabling association of each of the plurality of states with a control structure;
enabling association of each portion of the cache data with a set of attributes;
and
enabling each of the plurality of states to be aware of the cache data, wherein the plurality of states include at least:
a Free state where the cache data contains unvalidated data;

a Clean state where the cache data is valid and clean and no flush is required;

a Dirty state where the cache data is valid and dirty and a flush is required;

a Sticky state where the cache data is valid and clean and was accessed at least twice by at least one of a read operation or a write operation;

a StickyDirty state where the cache data contains valid dirty data that was accessed at least twice by at least one of a read operation or a write operation;

a Flush state where the cache data contains valid dirty data that is to be written to a storage device; and a Hash state where the cache is in the process of getting valid data from at least one of the physical storage device or a host.

18. The system of claim 17, further comprising separating Clean cache data from Dirty cache data to enable mirroring of the Dirty cache data for redundant cache coherency.

19. The system of claim 17, further comprising:
utilizing a hash object to speed up cache data lookup;
enforcing a total maximum Dirty data threshold;
collecting statistics for each portion of cache data including at least one of a read access count, a write access count, and a time since last flush; and
collecting statistics for the cache, including at least one of a cache hit count, a cache miss count, and an average access count.

20. The system of claim 17, wherein at least one state is treated as a separate virtual cache employing a replacement process.

21. The system of claim 17, wherein the data flow manager performs further actions, including:
providing a request to flush a least one of a Data Flow Manager and a Flush Manager if the combined Free state and Clean state have a minimum threshold that is exceeded; and
providing a request to flush to at least one of a Data Flow Manager and a Flush Manager if a maximum threshold for the Dirty state is exceeded.

22. The system of claim 17, wherein the data flow manager performs further actions, including:
enabling the Dirty state to provide a minimum threshold that enables a Data Flow manager to stop flushing before the cache data is completely flushed; and
enabling the StickyDirty state to provide a maximum threshold, wherein if the maximum threshold is exceeded, enabling a transition of one or more portions of cache data to the Dirty state, and wherein if the Sticky-Dirty state is over the maximum threshold, providing a request to flush to at least one of a Data Flow Manager and a Flush Manager.

23. The system of claim 17, wherein the data flow manager enables further actions, including enabling a request to flush to be provided to at least one of the Data Flow Manager and a Flush Manager if a time delta is greater than a time threshold.

24. An apparatus comprising:
a cache
a data flow manager, for managing the cache, the data flow manager processing a request for data, including:
enabling data in the cache to be assigned a state to each portion of cache data, wherein each portion of the cache data is further enabled for use with a state machine comprising a plurality of states and a set of state transitions;
enabling association of each of the plurality of states with a control structure;
enabling association of each portion of the cache data with a set of attributes;
and
enabling each of the plurality of states to be aware of the cache data, wherein the plurality of states include at least:
a Free state where the cache data contains unvalidated data;
a Clean state where the cache data is valid and clean and no flush is required;
a Dirty state where the cache data is valid and dirty and a flush is required;
a Sticky state where the cache data is valid and clean and was accessed at least twice by at least one of a read operation or a write operation;
a StickyDirty state where the cache data contains valid dirty data that was accessed at least twice by at least one of a read operation or a write operation;
a Flush state where the cache data contains valid dirty data that is to be written to a storage device; and
a Hash state where the cache is in the process of getting valid data from at least one of the physical storage device or a host.

* * * * *

UNITED STATES PATENT AND TRADEMARK OFFICE
CERTIFICATE OF CORRECTION

| | | |
|---|---|---|
| PATENT NO. | : 7,725,661 B2 | Page 1 of 1 |
| APPLICATION NO. | : 12/054834 | |
| DATED | : May 25, 2010 | |
| INVENTOR(S) | : Wei Liu et al. | |

It is certified that error appears in the above-identified patent and that said Letters Patent is hereby corrected as shown below:

On the cover page, item (57), in column 2, in "Abstract", line 2, delete "base" and insert -- based --, therefor.

In column 4, line 10, delete "exemplar" and insert -- exemplary --, therefor.

In column 6, line 50, delete "requester." and insert -- requestor. --, therefor.

In column 18, line 12, in claim 24, delete "cache" and insert -- cache; --, therefor.

Signed and Sealed this
Twenty-second Day of February, 2011

David J. Kappos
*Director of the United States Patent and Trademark Office*